(12) United States Patent
Kalsi

(10) Patent No.: US 6,220,222 B1
(45) Date of Patent: *Apr. 24, 2001

(54) ELECTRONIC CONTROL ASSEMBLY FOR A PEDAL

(75) Inventor: Avtar Kalsi, Windsor (CA)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/314,481

(22) Filed: May 18, 1999

(51) Int. Cl.$^7$ .............................. F02D 11/10; G05G 1/14
(52) U.S. Cl. ........................ 123/399; 74/514; 74/560
(58) Field of Search .................... 123/399, 361; 74/512, 513, 514, 560

(56) References Cited

U.S. PATENT DOCUMENTS

| | | | |
|---|---|---|---|
| 4,345,235 | 8/1982 | Riley et al. | 338/176 |
| 4,869,220 | 9/1989 | Imoehl | 123/399 |
| 4,883,037 | 11/1989 | Mabee et al. | 123/399 |
| 4,915,075 | * 4/1990 | Brown | 123/399 |
| 4,958,607 | 9/1990 | Lundberg | 123/399 |
| 5,133,321 | * 7/1992 | Hering et al. | 123/399 |
| 5,233,882 | 8/1993 | Byram et al. | 74/514 |
| 5,241,936 | 9/1993 | Byler et al. | 123/399 |
| 5,295,409 | * 3/1994 | Byram et al. | 74/514 |
| 5,321,980 | * 6/1994 | Hering et al. | 123/361 |
| 5,385,068 | 1/1995 | White et al. | 74/512 |
| 5,408,899 | 4/1995 | Stewart | 74/513 |
| 5,415,144 | * 5/1995 | Hardin et al. | 123/399 |
| 5,438,516 | * 8/1995 | Neubauer et al. | 74/514 |
| 5,481,141 | * 1/1996 | Brown et al. | 123/399 |
| 5,697,260 | 12/1997 | Rixon et al. | 74/514 |
| 5,768,946 | 6/1998 | Fromer et al. | 74/514 |
| 5,819,593 | 10/1998 | Rixon et al. | 74/514 |

OTHER PUBLICATIONS

Provisional application SN:60/088,639 Filed: Jun. 9, 1998 Entitled: Electronic Throttle Control with Hysteresis.

* cited by examiner

Primary Examiner—Henry C. Yuen
Assistant Examiner—Hieu T. Vo
(74) Attorney, Agent, or Firm—Howard & Howard

(57) ABSTRACT

An accelerator pedal assembly for an electronic throttle control includes a housing, a pedal arm, and a sensor assembly for generating an electric control signal that varies in relation to the position of the pedal arm. The pedal arm is supported for movement relative to the housing and has a first end connected to a pedal pad and a second end pivotally supported on a shaft to define a pivot axis. The sensor assembly includes a sensor member that is pivotally mounted on the shaft for pivotal movement with the pedal arm about the pivot axis. The pedal assembly is characterized by the housing presenting a sensing surface for interacting with the sensor member to generate the electric control signal that varies in magnitude in proportion to the extent of movement of the pedal arm relative to the housing.

20 Claims, 5 Drawing Sheets

ELECTRONIC CONTROL ASSEMBLY FOR A PEDAL

TECHNICAL FIELD

The subject invention relates to a pedal assembly with a sensor that generates an electric signal for controlling a vehicle system. Specifically, the pedal assembly includes a housing and a pedal arm extending from said housing to terminate at a pedal pad; a sensor member is mounted for pivotal movement with the pedal arm as a force is applied to the pedal pad, and the housing has a sensing surface that interacts with the sensor member to generate the electric control signal.

BACKGROUND OF THE INVENTION

Pedal assemblies are used in vehicles to control the movement of the vehicle. Typically pedal assemblies include mechanical connections to the respective vehicle system that the pedal controls. For example, a mechanical connection for an accelerator pedal usually includes a bracket and cable connect to an engine throttle. The rotary movement of the pedal is transferred to the engine throttle via the cable. The cable controls the position of the engine throttle based on the position of the pedal. These pedal assemblies have a desirable feel experience by the operator due to hysteresis feedback provided by the mechanical linkage interconnecting the accelerator pedal and the fuel throttle. With a mechanical linkage, the pedal pressure required when advancing the accelerator pedal is greater than that required to maintain a fixed position. This difference is often referred to as the hysteresis effect. This effect is importance for reducing operator fatigue.

As vehicles incorporate more electrically control vehicle systems, attempts have been made to provide an electrical link between the pedal and the vehicle system to be controlled. Mechanical connections are often bulky and difficult to package within the limited space available in the vehicle. The components in the mechanical linkages are also subject to wear and can bind or stick causing the vehicle system to become inoperable. The electrical link eliminates the need for mechanical linkage parts and thus, reduces cost and increases packaging space for other vehicle components.

An example of a pedal incorporating an electric control is shown in U.S. Pat. Nos. 5,697,260 and 5,819,593. The pedal assemblies include a pedal arm that is pivotally mounted within a housing that is supported by a vehicle structure. The pedal arm pivots with respect to the housing as a force is applied to a pedal connected to one end of the pedal arm. The pedal assemblies include a separate sensor assembly, such as a potentiometer, that is installed within the housing. The sensor assembly generates an electric signal that varies in proportion to the movement of the pedal arm with respect to the housing.

Another example of a pedal with an electric control is shown in U.S. Pat. No. 5,768,946. A separate sensor module is installed within the housing. The sensor module includes an electrical connector for connection to the vehicle system to be controlled. As discussed above, the sensor module is used to sense the position of the pedal and generates an electric signal that varies as the pivotal pedal position varies. Typically, these sensor modules are potentiometers. The potentiometers are sensitive to dirt and other contaminants and thus must be provided in a sealed environment in order to operate properly. The sensor modules are thus, self-contained and are installed into the pedal housing as a sealed component. The sensor modules are expensive and bulky. The pedal housing must be specially designed to accommodate these large sensor modules, which is undesirable.

Thus, it would be desirable to have a more compact pedal assembly with an integrated sensing components that do not require are separate sensor housing while still providing a sealed environment to keep out dirt and other components. Also, it is desirable to provide a pedal assembly with integrated sensing components that also includes a resistance assembly for generating a hysteresis effect that is also sealed within the same housing. This would improve packaging and reduce cost and assembly time for the pedal.

SUMMARY OF THE INVENTION AND ADVANTAGES

An accelerator pedal assembly for an electronic throttle control includes a housing and a pedal arm supported for movement relative to the housing. The pedal arm has a first end connected to a pedal pad and a second end pivotally supported on a shaft to define a pivot axis. A sensor member is pivotally mounted on the shaft for pivotal movement with the pedal arm about the pivot axis. The housing presents a sensing surface for interacting with the sensor member to generate an electric control signal that varies in magnitude in proportion to the extent of movement of the pedal arm relative to the housing.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
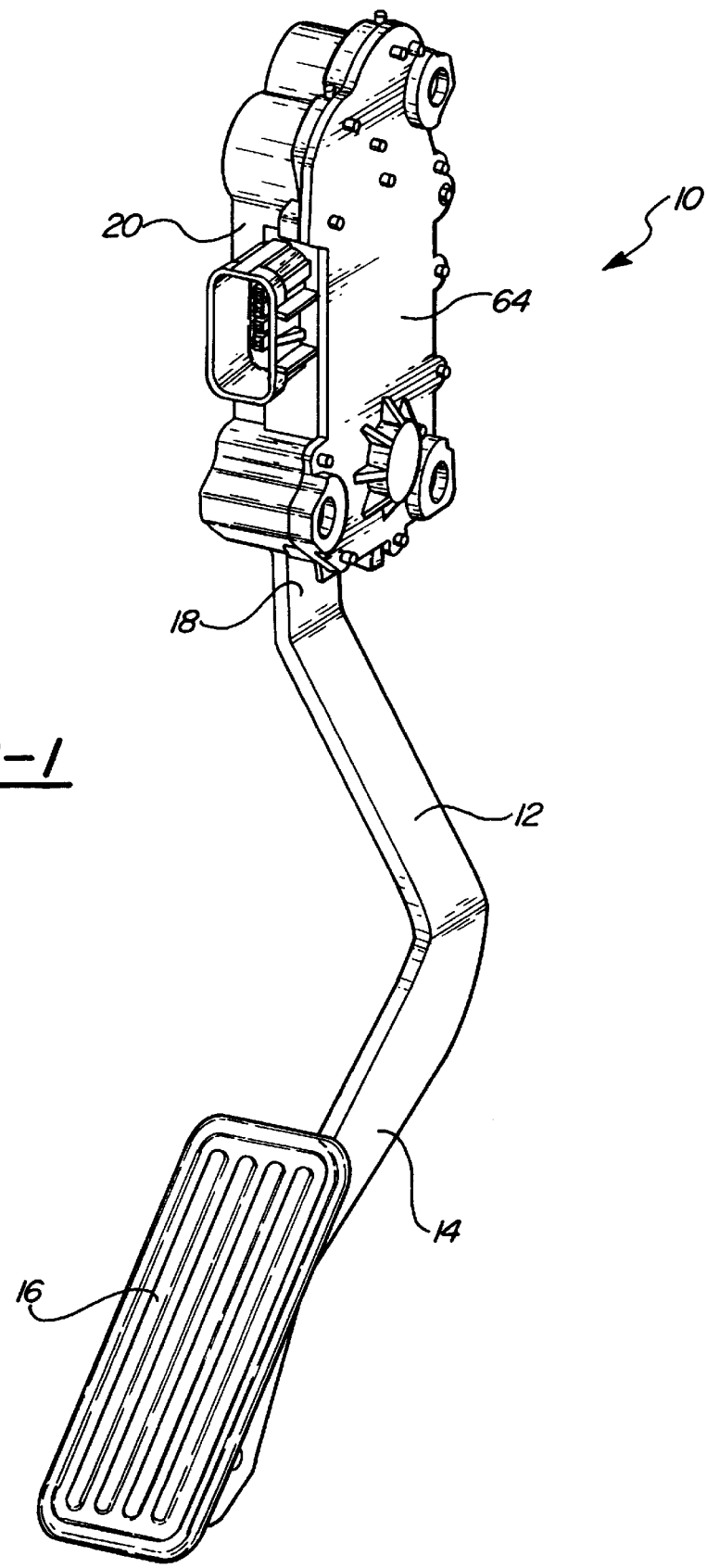
FIG. 1 is a perspective view of the pedal assembly.

Referring to the Figures, wherein like numerals indicate like or corresponding parts throughout the several views, a pedal assembly is shown generally at 10 in FIG. 1. The pedal assembly 10 includes a pedal arm 12 with a lower end 14 operatively connected to a pedal pad 16 and an upper end 18 pivotally mounted with a housing 20. The pedal assembly 10 generates an electric control signal that is used to control a vehicle system function such as a throttle position. The electric control signal varies in magnitude as a force is applied to the pedal pad 16 to move the pedal arm from a rest position to an applied position.

The pedal arm 12 is supported for movement relative to the housing 20 on a pivot shaft 22 that defines a pivot axis 24. The pedal arm 12 is preferably formed from a steel or plastic material. A sensor assembly is also mounted within the housing 20. The sensor assembly includes a sensor member 26 that is pivotally mounted on the shaft 22 for pivotal movement with the pedal arm 12 about the pivot axis 24. Preferably, the sensor member 26 is fixed directly to the shaft 22 for rotation therewith.

The housing 20 includes an interior face 28 that presents a sensing surface 30 for interacting with the sensor member 26 to generate an electric control signal that varies in magnitude in proportion to the extent of movement of the pedal arm 12 relative to the housing 20. Preferably the sensing surface 30 is a separate component that is attached by means well known in the art to the interior face 28 of the housing 20, such that the sensing surface 30 and interior face 28 are formed as one piece. Preferably the interior face 28 is formed from a ceramic material and the sensing surface 30 is heat staked to the ceramic with printing. The sensing surface 30 will be discussed in greater detail below.

In the preferred embodiment, the sensor member 26 is a plastic pivot arm with a plurality of fingers 32 extending along an axial length of the arm. Each of the fingers 32 is positioned at a different radial distance from the pivot axis 24. As the pedal 12 arm pivots the shaft 22 about the pivot axis 24, the pivot arm 26 also pivots about the axis 24 causing the fingers 32 to move in an arc with respect to the interior face 28 of the housing 20. The arc lengths through which the fingers 32 move vary depending upon the axial position of the finger 32 on the pivot arm 26. Thus, the fingers 32 located near the distal tip of the pivot arm 26 will move across a longer arc than the fingers 32 located closer to the pivot shaft 22.

Also, in the preferred embodiment, the sensing surface 30 is comprised of a plurality of sensing bands 34 extending across the interior face 28 of the housing 20. Each of the bands 34 is positioned transversely across the interior face 28 with respect to the pivot shaft 22 at different radial distances from the pivot axis 24. These bands 34 are resistance elements that are well known in the art for generating an electric signal and are manufactured by Spectrol Electronics Corp. One example of the composition of a resistance element and the method for making the resistance element is disclosed in U.S. Pat. No. 4,345,235, which is assigned to Spectrol Electonics Corp.

As the pivot arm 26 moves in an arc about the pivot axis 24, the fingers 32 wipe against the sensing bands 34 at the various radial locations to generate the electric control signal. Thus, the sensor member 26 presents an axial face for interacting with the sensing surface 30 such that when a force is applied to the pedal pad 16, the axial face moves in an arc about the pivot axis 24 in wiping engagement with the sensing surface 30 to generate the electric throttle control signal.

Figure 4:
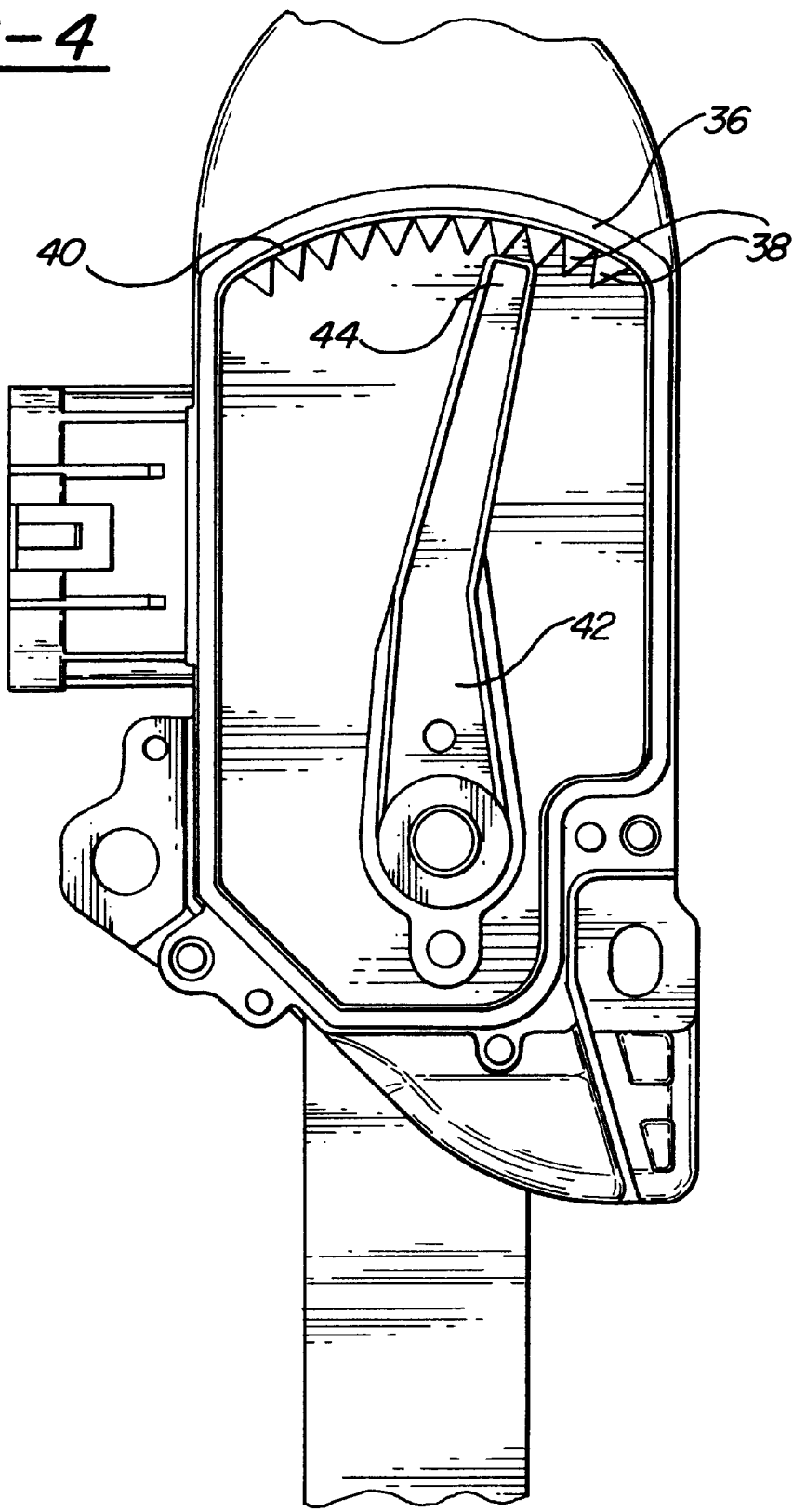
FIG. 4 is a side view, partially broken away, with the cover removed of the of the pedal assembly shown in FIG. 1 and showing an alternate embodiment of the sensor member and sensing surface.
Figure 6:
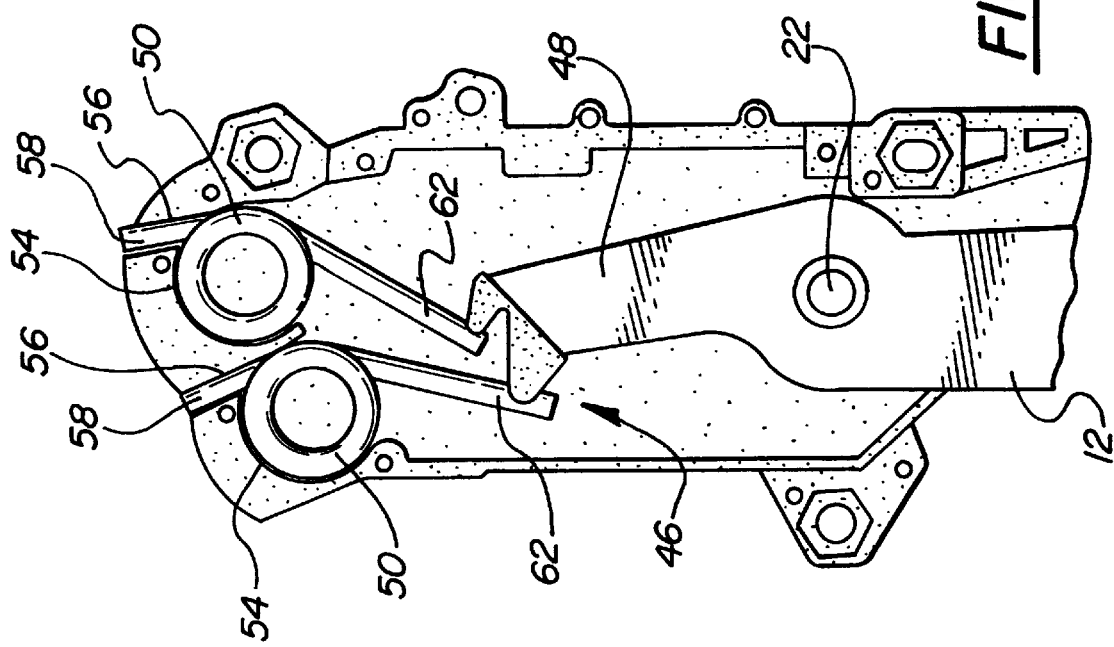
FIG. 6 is a side view, partially broken away, with the cover and dividing portion removed and showing the resistance assembly when the pedal arm is in the applied position.

In an alternate embodiment, shown in FIG. 4, the housing 22 includes a circular pocket portion 36 presenting a plurality of integrally formed resistance elements 38 about a circumferential edge 40 of the pocket 36. In this embodiment the sensor member is a pivot arm 42 with a sensing tip portion 44 that moves in an arc as a force is applied to the pedal pad 16. The tip portion 44 wipes across the resistance elements 38 to generate the electric control signal. The generation of the electric signal is done in a similar way as disclosed in U.S. Pat. No. 5,697,260 owned by the same assignee as this application and is herein incorporated by reference.

As shown in FIGS. 2, 3, 5, and 6, the pedal assembly 10 includes a resistance assembly 46 that is used to provide a hysteresis effect to reduce operator fatigue. The resistance assembly 46 is intended to provide feedback or "feel" to the operator to replace the feedback normally provided by the mechanical linkage interconnecting the accelerator pedal and the fuel throttle. With a mechanical linkage, the pedal pressure required when advancing the accelerator pedal is greater than that required to maintain a fixed position. This difference is often referred to as the hysteresis effect. This effect is important in maintaining the accelerator pedal 10 in position while driving at a relatively constant speed and it must also be considered in achieving a desired deceleration time. The pressure which must be applied in accelerating is easily borne but if the back pressure of an accelerator spring produced the same effect during the time it was require to retain or maintain speed it would soon become uncomfortable for the operator to maintain a relatively constant speed. The hysteresis effect provides relief. It lessens the load required to maintain a setting of the accelerator yet there is still force to cause reverse pedal action when the foot applied pressure is removed. The resistance assembly 46 provides the "feel" of a mechanical linkage including the desired hysteresis effect to relive operator fatigue.

Figure 5:
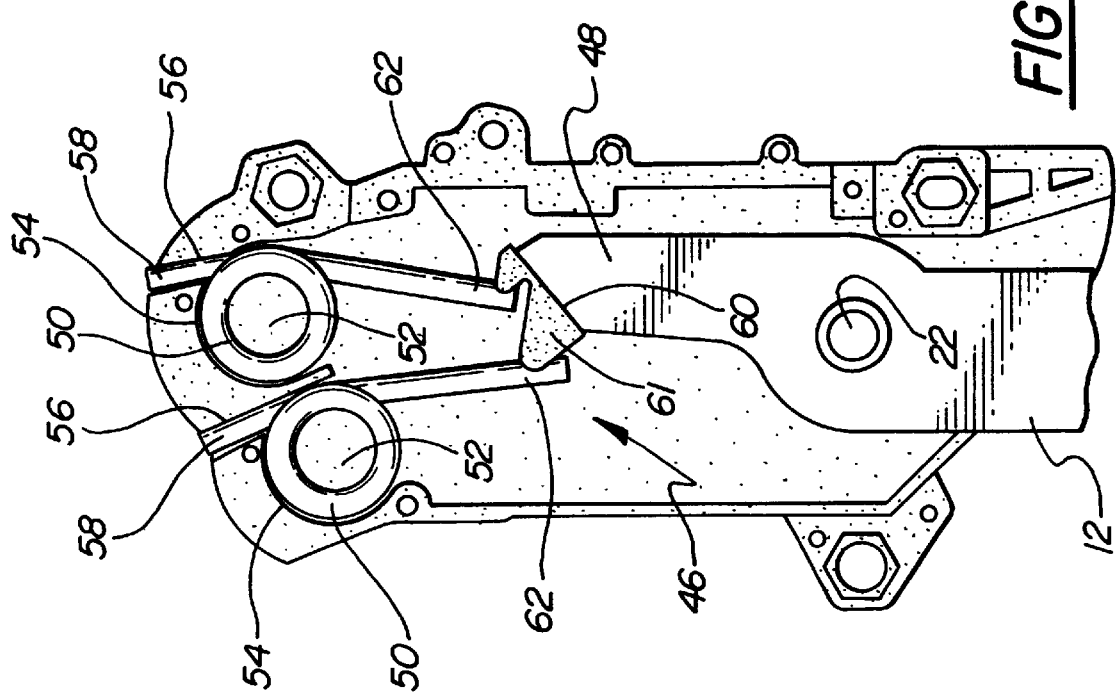
FIG. 5 is a side view, partially broken away, with the cover and dividing portion removed and showing the resistance assembly when the pedal arm is in the rest position.

As shown in FIG. 5, the pedal arm 12 includes an upper portion 48 extending above the pivot axis 24 for interacting with a resilient spring 50 to provide the hysteresis effect. In the preferred embodiment, a pair of springs 50 are use, however any number of springs 50 may be used to create the desired hysteresis effect. The housing 20 includes a recess portion 52 with a curved side wall 54 for receiving the spring 50. The recess 52 has a tangentially extending notch 56 for seating a first end 58 of the spring 50. The upper portion 48 of the pedal arm 12 includes a cam lobe 60 that applies a force to a second end 62 of the spring 50 as the pedal arm 12 pivots about the axis 24. Preferably, the cam lobe includes a cap member 61 with that provides an improved wear face. The spring 50 is forced into frictional contact with the side wall 54 when the pedal arm 12 is pivoted from a rest position (shown in FIG. 5) to an applied position (shown in FIG. 6) to reduce the spring force of the spring 50 on the pedal arm 12.

Figure 2:
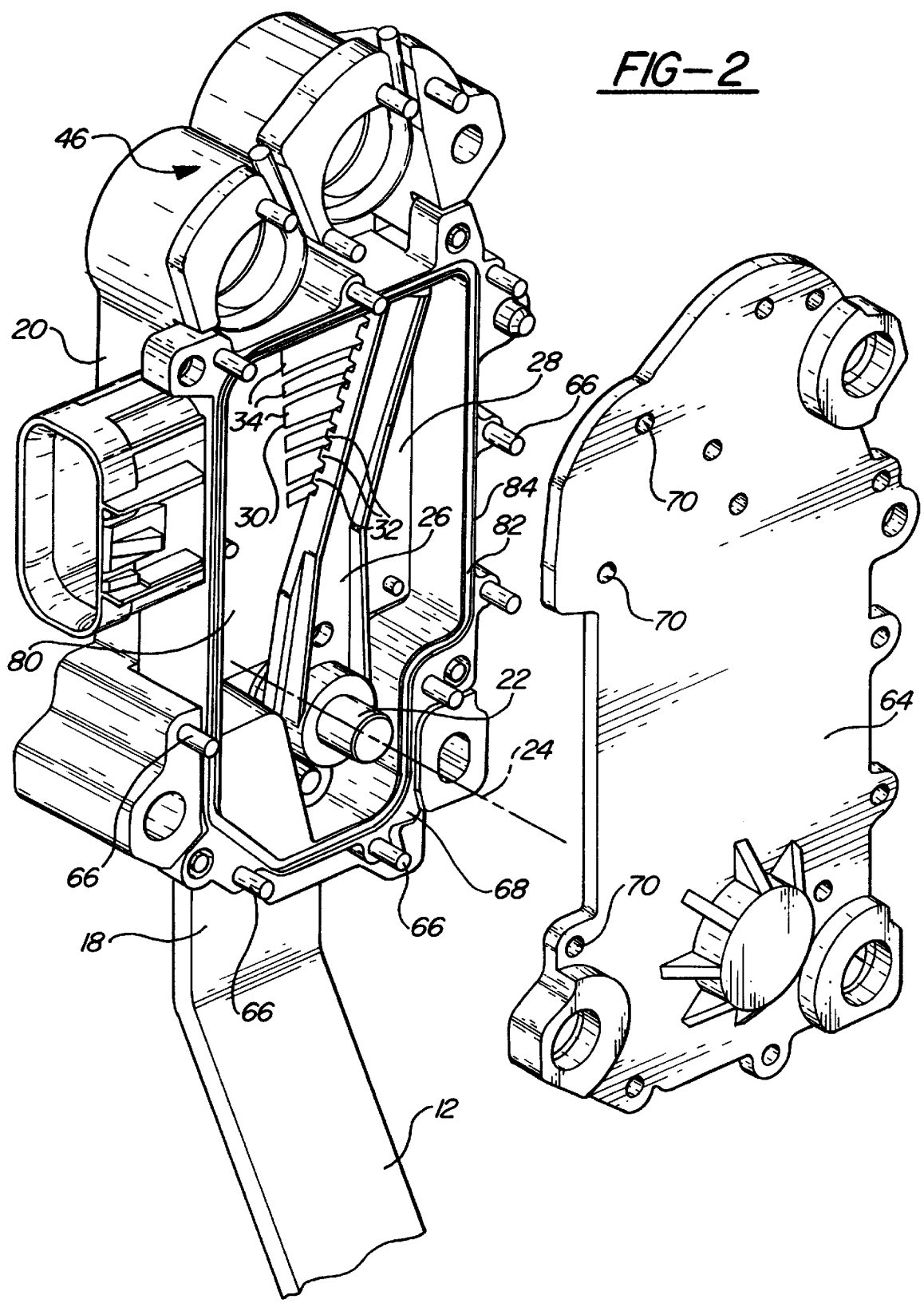
FIG. 2 is an exploded view. partially broken away, of the pedal assembly shown in FIG. 1.

As shown in FIG. 2, the pedal assembly 10 includes a cover 64 for attachment to the housing 20 to provide a sealed environment for the sensor member 26 and the sensing surface 30. The sensing surface 30 should be free of dirt and other contaminants in order to work efficiently. The cover keeps the dirt from interfering in the operation of the sensor member 26 as it wipes against the sensing surfaces 34. Preferably the housing 20 and cover 64 are light weight and are made from a nylon or plastic material.

The housing 20 preferably includes a plurality of tabs 66 spaced around a circumferential lip 68 of the housing 20. The tabs 66 are inserted into corresponding openings 70 in the cover 64 and are heat staked to fasten the housing 20 and cover 64 together. It should be understood, however, that other fastening methods known in the art could also be used to connect the housing 20 to the cover 64.

The housing 20 also includes a groove 82 extending around an outer peripheral surface 84. An epoxy sealer is placed applied to the groove 82 and the cover 64 is attached to the housing 20. This provides a sealed environment for the sensor member 26 and sensing surface 30. Other sealing methods known in the art can also be used. O-rings (not shown) are used to seal the pivot shaft 22 within the housing 20 and cover 64.

As shown in FIG. 4, each of the bands 34 is electrically connected to a output node 72. As the sensor member 26 wipes across the sensing surface 30 electrical signals are generator and sent to the nodes 72. An electrical connection port 74 is integrally formed to one side of the housing 20. An electrical connector (not shown) is inserted into the port 74 and the electrical signal generated by the interaction of the sensor member 26 with sensing surface 30 is sent to a vehicle control system 76 such as a computer, for example. The signal is then sent to the engine throttle, shown schematically at 78, which is then moved to the desired position.

Together, the sensing member 26 and sensing surface 30 act as a potentiometer. The operation of a potentiometer is well known in the art and will not be discussed in detail. One advantage of the subject inventive pedal assembly 10 is that a separate potentiometer sensor is not required for the assembly. The sensing components, i.e., the sensor member 36 and sensing surface 30 are instead integrated directly into the housing 20 of the pedal assembly 10. The sensing surface 30 is attached to an interior face 28 of the housing 20 such that the interior face 28 and sensing surface 30 are formed as one piece, and the sensor member 26 is fixed for rotation with the pedal pivot shaft 22.

Figure 3:
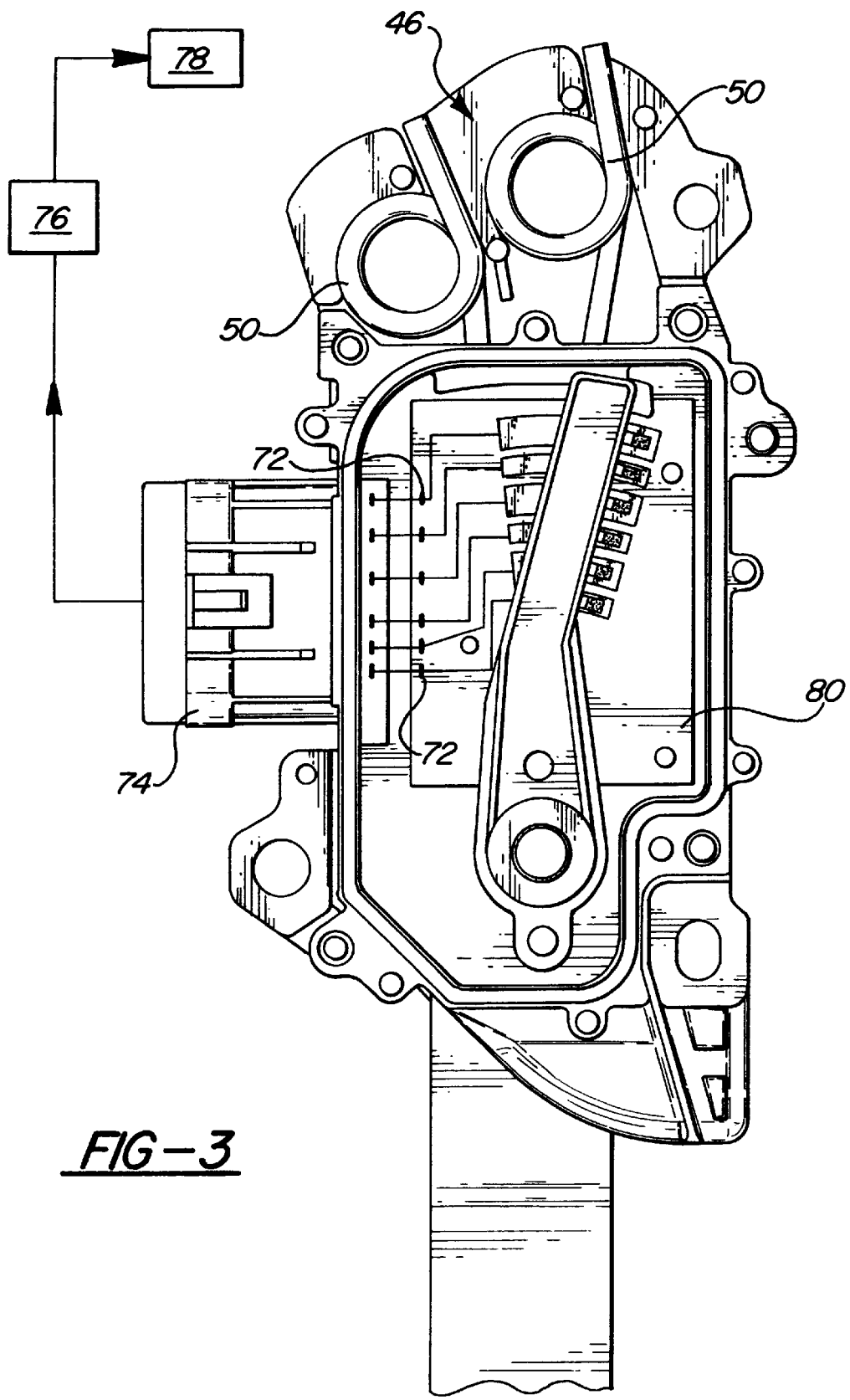
FIG. 3 is a side view, partially broken away, with the cover removed of the of the pedal assembly shown in FIG. 1 and showing one embodiment of the sensor member and sensing surface.

The housing is preferably made from a plastic material and includes a central dividing section 80 that forms the interior face 28 of the housing. As discussed above, the interior face 38 is preferably formed from a ceramic material, however, other materials such as plastic could be used. The sensing surface 30 is on one side of the dividing section 80 and the resistance assembly 46 is positioned on an opposite side of the dividing section. First the resistance assembly 46 is mounted within the housing 20, the dividing section 80 with the sensing surface 34 is installed, the sensor member 26 is mounted on the pivot shaft 22, and then the cover 64 is attached to the housing 20. It should be understood that the inventive pedal assembly can be used with other types of resistance assemblies known in the art. The configuration and orientation of the resistance assembly 46 shown in FIGS. 2, 3, and 5 is simply a preferred embodiment.

Although the inventive pedal assembly 10 has been described in detail for use in controlling the throttle of the associated vehicle, the inventive pedal assembly 10 may be used to electrically control a wide variety of vehicle functions or accessories.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A pedal assembly for electronically controlling a vehicle comprising:
   a housing:
   a pedal arm supported for movement relative to said housing and having a first end connected to a pedal pad and a second end pivotally supported on a shaft to define a pivot axis;
   a sensor member pivotally mounted on said shaft for pivotal movement with said pedal arm about said pivot axis;
   said housing presenting a sensing surface for interacting with said sensor member to generate an electric control signal that varies in magnitude in proportion to the extent of movement of said pedal arm relative to said housing,
   a cover for attachment to said housing to enclose said sensor member and said sensing surface within said housing.

2. An assembly as set forth in claim 1 wherein said housing includes a groove extending about an outer periphery of said housing, said groove for receiving a seal to provide a sealed environment for said sensor member and said sensing surface when said cover is attached to said housing.

3. A pedal assembly for electronically controlling a vehicle comprising:
   a housing;
   a pedal arm supported for movement relative to said housing and having a first end connected to a pedal pad and a second end pivotally supported on a shaft to define a pivot axis;
   a sensor member pivotally mounted on said shaft for pivotal movement with said pedal arm about said pivot axis;
   said housing presenting a sensing surface for interacting with said sensor member to generate an electric control signal that varies in magnitude in proportion to the extent of movement of said pedal arm relative to said housing,
   said housing including a circular pocket portion presenting a plurality of resistance elements about a circumferential edge of said pocket.

4. An assembly as set forth in claim 3 wherein said sensor member is a pivot arm with a sensing tip portion that moves in an arc as a force is applied to said pedal pad, said tip portion wiping across said resistance elements to generate said electric control signal.

5. A pedal assembly for electronically controlling a vehicle comprising:
   a housing;
   a pedal arm supported for movement relative to said housing and having a first end connected to a pedal pad and a second end pivotally supported on a shaft to define a pivot axis;
   a sensor member pivotally mounted on said shaft for pivotal movement with said pedal arm about said pivot axis;
   said housing presenting a sensing surface for interacting with said sensor member to generate an electric control signal that varies in magnitude in proportion to the extent of movement of said pedal arm relative to said housing,
   said pedal arm including an upper portion extending above said pivot axis for interacting with a spring to provide a hysteresis effect.

6. An assembly as set forth in claim 5 wherein said housing includes a recess portion with a curved side wall for receiving said spring, said recess having a tangentially extending notch for seating a first end of said spring.

7. An assembly as set forth in claim 6 wherein said upper portion of said pedal arm includes a cam lobe that applies a force to a second end of said spring as said pedal arm pivots about said axis.

8. An assembly as set forth in claim 7 wherein said spring is forced into frictional contact with said side wall when said pedal arm is pivoted from a rest position to an applied position to reduce the spring force of said spring on said pedal arm.

9. A pedal assembly for electronically controlling a vehicle comprising:
   a housing;
   a pedal arm supported for movement relative to said housing and having a first end connected to a pedal pad and a second end pivotally supported on a shaft to define a pivot axis;
   a sensor member pivotally mounted on said shaft for pivotal movement with said pedal arm about said pivot axis;
   said housing presenting a sensing surface for interacting with said sensor member to generate an electric control signal that varies in magnitude in proportion to the extent of movement of said pedal arm relative to said housing, said sensing surface being mounted within said housing such that said sensing surface and said housing are formed as one piece, said sensor member being a pivot arm with a plurality of fingers extending along an axial length of said arm, each of said fingers being positioned at a different radial distance from said pivot axis.

10. An assembly as set forth in claim 9 wherein said sensing surface is comprised of a plurality of sensing bands extending across an interior surface of said housing, each of said bands being positioned transversely with respect to said pivot axis at different radial locations from said pivot axis.

11. An assembly as set forth in claim 10 wherein said pivot arm moves in an arc about said pivot axis as a force is applied to said pedal pad with said fingers wiping against said sensing bands at the various radial locations to generate said electric control signal.

12. An electronic throttle control assembly comprising:
a housing;
a pedal arm supported for movement relative to said housing and having a first end connected to a pedal pad and a second end pivotally supported on a shaft to define a pivot axis; and
a generator mechanism having an input associated with said pedal arm and an output operably associated with an engine throttle, said generator mechanism including a sensor member pivotally mounted on said shaft for pivotal movement with said pedal arm about said pivot axis;
said housing presenting a sensing surface for interacting with said sensor movement to generate an electric control signal from said output that varies in magnitude in proportion to said input by the extent of movement of said pedal arm relative to said housing whereby said control signal for the engine throttle is proportioned to and indicative of the position of said pedal arm relative to said housing,
said sensing surface being mounted on an interior face of said housing such that said sensing surface and housing are formed as one piece,
a cover mounted to said housing opposite from said interior face to enclose said sensor member and said sensing surface within said housing.

13. An assembly as set forth in claim 12 wherein said sensor member is comprised of a pivot arm with a plurality of integrally formed and radially spaced sensing fingers, and wherein said sensing surface is comprised of a plurality of sensing bands, one band for each finger, said bands being spaced at different radial distances from said pivot axis such that when said pedal arm pivots about said pivot axis, said sensing fingers wipe across said sensing bands to generate said electric control signal.

14. An assembly as set forth in claim 12 wherein said housing includes a circular pocket with a plurality of resistance elements extending about the circumference of said pocket, and wherein said sensor member is comprised of a pivot arm terminating at a sensing tip that wipes in an arc against said resistance elements to generate said electric control signal when said pedal arm pivots about said pivot axis.

15. An electronic throttle control system comprising:
a pedal arm having a lower end connected to a pedal pad and an upper end pivotally supported on a pivot shaft to define a pivot axis;
a housing for supporting said pivot shaft such that said pedal arm is mounted for movement relative to said housing about said pivot axis;
a sensor assembly including a sensor member pivotally mounted on said shaft for pivotal movement with said pedal arm about said pivot axis and a sensing surface extending across an interior face of said housing for interacting with said sensor member to generate an electric throttle control signal that varies in magnitude in proportion to the extent of movement of said pedal arm relative to said housing;
a resilient member mounted within a curved pocket of said housing, said resilient member having a first end fixed to said housing and a second end engageable by a camming portion on said upper end of said pedal arm to create a hysteresis effect when said pedal arm is moved from a rest position to an applied position; and
a cover connected to said housing for enclosing said sensor assembly within said housing to provide a sealed environment for said sensor member and said sensing surface.

16. A system as set forth in claim 15 wherein said sensor member is comprised of a wiper arm with a first end fixed for rotation with said pivot shaft and a second end presenting an axial face for interacting with said sensing surface such that when a force is applied to said pedal pad, said axial face moves in an arc about said pivot axis in wiping engagement with said sensing surface to generate said electric throttle control signal.

17. A method for assembling a pedal that generates an electric signal for controlling a vehicle system comprising the steps of:
(a) providing a housing formed as a single piece;
(b) pivotally mounting a pedal arm within the housing;
(c) providing a sensing surface formed as part of the housing;
(d) mounting a sensor member for pivotal movement with the pedal arm;
(e) aligning the sensor member for interacting with the sensing surface; and
(f) attaching a cover to the housing to enclose the sensor member and sensing surface within the housing.

18. A method as set forth in claim 17 further including the step of installing a hysteresis assembly within the housing before step (b).

19. A method as set forth in claim 17 further including the step of forming the sensing surface and the housing as one piece.

20. A method as set forth in claim 17 further including the steps of mounting the pedal arm on a pivot shaft during step (b) supported in the housing and fixing the sensor member to the shaft for rotation therewith during step (d).

* * * * *